United States Patent
Zhang et al.

(10) Patent No.: US 10,320,513 B2
(45) Date of Patent: Jun. 11, 2019

(54) DISTRIBUTED AUTOMATIC POWER OPTIMIZATION SYSTEM AND METHOD

(71) Applicant: ZTE Corporation, Shenzhen (CN)

(72) Inventors: Lijun Zhang, Shenzhen (CN); Mingchao Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/576,913

(22) PCT Filed: Apr. 1, 2016

(86) PCT No.: PCT/CN2016/078329
§ 371 (c)(1),
(2) Date: Nov. 27, 2017

(87) PCT Pub. No.: WO2016/188228
PCT Pub. Date: Dec. 1, 2016

(65) Prior Publication Data
US 2018/0145787 A1 May 24, 2018

(30) Foreign Application Priority Data
May 26, 2015 (CN) .......................... 2015 1 0275777

(51) Int. Cl.
*H04B 10/079* (2013.01)
*H04J 14/02* (2006.01)
(Continued)

(52) U.S. Cl.
CPC ...... *H04J 14/0228* (2013.01); *H04B 10/0797* (2013.01); *H04B 10/07955* (2013.01);
(Continued)

(58) Field of Classification Search
None
See application file for complete search history.

(56) References Cited

U.S. PATENT DOCUMENTS

| 5,812,710 A * | 9/1998 | Sugaya | H01S 3/1301 359/337 |
| 6,055,092 A * | 4/2000 | Sugaya | H01S 3/06754 359/337 |

(Continued)

FOREIGN PATENT DOCUMENTS

| CN | 1633057 A | 6/2005 | |
| CN | 1665175 A * | 9/2005 | ............. H04B 10/12 |

(Continued)

OTHER PUBLICATIONS

International Search Report for corresponding application PCT/CN2016/078329 filed on Apr. 1, 2016; dated Jun. 7, 2016.
(Continued)

*Primary Examiner* — Li Liu
(74) *Attorney, Agent, or Firm* — Cantor Colburn LLP

(57) ABSTRACT

A distributed Automatic Power Optimization (APO) system and method are provided. The distributed APO system includes: one or more APO modules and a network management system. The one or more APO modules belong to one or more pre-divided APO links. Each APO module in the one or more APO modules belongs to only one APO link. The APO module is configured to, when the APO link to which the APO module belongs is triggered to perform power regulation, regulate a power attenuation or a gain between the two adjacent stations corresponding to the APO module and report a regulation result. The network management system is configured to, when learning that all of one or more APO modules in one APO link are successful in regulation, if there is a next APO link of the APO link, trigger the next APO link of the APO link to perform power regulation.

18 Claims, 6 Drawing Sheets

(51) Int. Cl.
    *H04B 10/293* (2013.01)
    *H04B 10/25* (2013.01)

(52) U.S. Cl.
    CPC ....... *H04B 10/07957* (2013.01); *H04B 10/25* (2013.01); *H04B 10/293* (2013.01); *H04J 14/02* (2013.01); *H04J 14/0221* (2013.01)

(56) References Cited

U.S. PATENT DOCUMENTS

| | | | | |
|---|---|---|---|---|
| 6,067,187 A * | 5/2000 | Onaka | ......... | H01S 3/06754 359/337 |
| 6,163,398 A * | 12/2000 | Inagaki | ......... | H01S 3/06758 359/337.5 |
| 6,229,631 B1 * | 5/2001 | Sato | ......... | H04B 10/0775 398/147 |
| 6,654,513 B1 * | 11/2003 | Liden | ......... | H04B 10/032 359/341.1 |
| 7,826,746 B2 * | 11/2010 | Stango | ......... | H04J 14/0217 359/334 |
| 7,860,396 B2 * | 12/2010 | Claringburn | ......... | H04J 14/0204 359/337.1 |
| 8,036,526 B2 * | 10/2011 | Bogoni | ......... | H04B 10/03 398/1 |
| 8,055,127 B2 * | 11/2011 | Magri | ......... | H04B 10/27 398/17 |
| 8,620,160 B2 * | 12/2013 | Onaka | ......... | H04B 10/07955 398/158 |
| 2002/0027703 A1 * | 3/2002 | Kinoshita | ......... | H01S 3/06758 359/337.1 |
| 2002/0051284 A1 * | 5/2002 | Takatsu | ......... | G06F 12/0866 359/341.1 |
| 2002/0071173 A1 * | 6/2002 | Lee | ......... | H01S 3/06758 359/337.1 |
| 2004/0247312 A1 * | 12/2004 | Hasuo | ......... | H04B 10/032 398/5 |
| 2007/0014571 A1 * | 1/2007 | Roberts | ......... | H04B 10/0793 398/25 |
| 2007/0081822 A1 * | 4/2007 | Li | ......... | H04B 10/077 398/19 |
| 2011/0116786 A1 * | 5/2011 | Wellbrock | ......... | H04B 10/032 398/2 |
| 2012/0070154 A1 * | 3/2012 | Portier | ......... | H04B 10/035 398/136 |
| 2012/0177369 A1 * | 7/2012 | Cheng | ......... | H04B 10/2931 398/38 |
| 2015/0016819 A1 * | 1/2015 | Piciaccia | ......... | H04B 10/0793 398/37 |
| 2015/0256252 A1 * | 9/2015 | Clouet | ......... | H04J 14/0221 398/38 |

FOREIGN PATENT DOCUMENTS

| | | |
|---|---|---|
| CN | 1665175 A | 9/2005 |
| CN | 1866797 A | 11/2006 |
| CN | 101043288 A | 9/2007 |
| CN | 103227681 A | 7/2013 |
| CN | 104509010 A | 4/2015 |
| WO | 2007107065 A1 | 9/2007 |
| WO | 2014015888 A1 | 1/2014 |

OTHER PUBLICATIONS

Supplementary European Search Report Application No. EP16799117; dated June 21, 2018, pp. 6.

* cited by examiner

DISTRIBUTED AUTOMATIC POWER OPTIMIZATION SYSTEM AND METHOD

TECHNICAL FIELD

The disclosure relates to, but not limited to, the field of communications, and particularly to a distributed Automatic Power Optimization (APO) system and method.

BACKGROUND

During operation of a wavelength division communication system, main optical power should ensure a power budget for system design, so as to ensure normal operation of a receiver. Meanwhile, in order to avoid influence of capacity expansion or addition or reduction operation of wavelength channels on existing service transmission, an optical amplifier in the system may need to work in a gain-clamped state. During operation of the system, if an attenuation of an optical fiber is changed by aging of the optical fiber or other factors, power of an optical signal of a service may be changed, and even the service may be interrupted in a severe case.

In order to avoid influence of a change in the attenuation of the optical fiber on service transmission, the wavelength division communication system may need to have an automatic power regulation function. That is, when the attenuation of the optical fiber is changed, an attenuation of an attenuator in the system may be automatically regulated or a gain of the amplifier may be regulated, so as to maintain the power budget for system design. An ordinary APO subsystem may be implemented on a network management system. Because the network management system is a multi-task operating system, an implementation mechanism of the APO subsystem on the network management system should be a regular query mechanism. If a regular query interval is too short, a large number of resources of the network management system may be occupied, which may easily cause crash of the network management system as well as low practicability for a practical project. But if the regular query interval is too long, a response speed for a change in the main optical power may be low, resulting in low execution efficiency.

SUMMARY

The below is a summary about a subject matter described in the disclosure in detail. The summary is not intended to limit the scope of protection of the claims.

Exemplary embodiments of the disclosure provide a distributed APO system and method, which may solve a problem of how to improve a response speed for a change in main optical power as well as execution efficiency on the premise of not occupying a large number of resources of a network management system.

In order to solve the problem, the following solutions are adopted.

A distributed APO system is provided, which may be applied to a wavelength division communication system and include one or more APO modules and a network management system.

The one or more APO modules may belong to one or more pre-divided APO links. Each APO module in the one or more APO modules may belong to only one APO link. Each APO module in one APO link may be in one to one correspondence with every two adjacent stations in the APO link.

The APO module may be configured to, when the APO link to which the APO module belongs is triggered to perform power regulation, regulate a power attenuation or a gain between the two adjacent stations corresponding to the APO module and report a regulation result.

The network management system may be configured to, when learning that all of one or more APO modules in one APO link are successful in regulation, if there is a next APO link of the APO link, trigger the next APO link of the APO link to perform power regulation.

In an exemplary embodiment, the network management system may further be configured to divide the one or more APO links and configure the one or more APO modules.

When dividing the one or more APO links, the network management system may determine optical add/drop stations and optical terminal stations as origin stations or termination stations of the one or more APO links, divide a working line and a protection line into two APO links when the working line and the protection line include optical amplifiers, divide the working line and the protection line into one APO link when there are only optical fibers on the working line and the protection line, and independently divide the one or more APO links for different transmission directions respectively.

In an exemplary embodiment, the APO module may include an attenuation regulator, an APO controller and a power detector.

The attenuation regulator may be configured to regulate optical signal power between the two adjacent stations corresponding to the APO module according to a set attenuation amount or gain value.

The power detector may be configured to, when input power of a receiving side of the two adjacent stations meets a first predetermined condition, trigger the APO controller to perform power query.

The APO controller may be configured to, when being triggered to perform power query, query output power of a sending side of the two adjacent stations, when a calculation result based on the input power and the output power meets a second predetermined condition, trigger a head node in the APO link to which the APO module belongs to initiate a regulation command, and regulate an attenuation amount or a gain value of the attenuation regulator according to the regulation command. In the exemplary embodiment, the head node may refer to an APO controller of an APO module corresponding to first two adjacent stations, sequentially counted along a service direction, in one APO link.

In an exemplary embodiment, the network management system may further be configured to transmit configuration information of the one or more APO links and the one or more APO modules. The configuration information of the one or more APO links and the one or more APO modules may include address information of head, end and intermediate nodes in each APO link, upstream/downstream relationships among various APO modules in each APO link, and a location of a board where each component in each APO module is located. The end node may refer to an APO controller of an APO module corresponding to last two adjacent stations, sequentially counted along a service direction, in one APO link. The intermediate node may refer to an APO controller of an APO module except the head and end nodes.

In an exemplary embodiment, information interaction may be performed, through optical monitoring channels in wavelength division equipment, between APO controllers of different APO modules and between an APO controller and the attenuation regulator and power detector in the APO module where the APO controller is located.

In an exemplary embodiment, the first predetermined condition may be as follows: an absolute value of a difference value between the input power and a preset input power reference value exceeds a preset input power fluctuation threshold.

In an exemplary embodiment, the second predetermined condition may be as follows: both an accumulated power offset and a local power offset between the two adjacent stations exceed a preset threshold, and a number of times for which both the accumulated power offset and the local power offset between the two adjacent stations exceed the preset threshold may be larger than 2.

In the exemplary embodiment, the accumulated power offset between the two adjacent stations may be a sum of the local power offset between the two adjacent stations and an upstream accumulated power offset.

In the exemplary embodiment, the local power offset between the two adjacent stations may be obtained by subtracting a line attenuation value and a gain offset between the two adjacent stations from a gain of the power detector. The line attenuation value may be obtained by subtracting the output power from the input power; the gain offset may be a preset value.

In the exemplary embodiment, the upstream accumulated power offset may refer to an accumulated power offset between two adjacent stations prior to the two adjacent stations in the APO link to which the APO module belongs along a service direction.

In an exemplary embodiment, the APO controller may be configured to regulate the attenuation amount or the gain value of the attenuation regulator according to the regulation command in a following manner.

When the APO controller is the head node, after the regulation command is initiated or the regulation command is received from the network management system, the attenuation amount or the gain value of the attenuation regulator of the corresponding APO module may be regulated. After the attenuation regulator completes executing the regulation command, if a state of the head node is not abnormal, a next node may be determined as a current node, and a regulation command may be transmitted to the current node. After a regulation success message is received, if it is the end node returning the regulation success message, a regulation success event may be reported to the network management system; if it is not the end node returning the regulation success message, a next node of the current node in the corresponding APO link may be determined as the current node, and a regulation command may be transmitted to the current node.

When the APO controller is not the head node, the attenuation amount or the gain value of the attenuation regulator of the corresponding APO module may be regulated after the regulation command is received. And after the attenuation regulator completes executing the regulation command, if the state of the node is not abnormal, a regulation success message may be returned to the head node.

In an exemplary embodiment, that the network management system, when learning that all of one or more APO modules in one APO link are successful in regulation, triggers the next APO link of this APO link to perform power regulation may include the following act.

When receiving the regulation success event reported by the head node in one APO link, the network management system may send a regulation command to the head node of a next APO link of the APO link along a service direction.

In an exemplary embodiment, that the state is not abnormal may refer to that: the accumulated power offset is less than or equal to 0.5 dB.

In an exemplary embodiment, the APO controller may be a Smart Node Protection (SNP) board; a power reference point may be an Optical Booster Amplifier (OBA) board; the attenuation regulator may be an Attenuator (ATT) single board or an Optical Pre-Amplifier (OPA) single board; and the power detector may be an OPA single board.

A distributed APO method is provided, which may be applied to a wavelength division communication system and include the following acts.

After any APO link in one or more pre-divided APO links is triggered to perform power regulation, each APO module in one to one correspondence with every two adjacent stations in the APO link may regulate a power attenuation or a gain between the two adjacent stations corresponding to the APO module, and report a regulation result.

After power between every two adjacent stations in the APO link is successfully regulated, if there is a next APO link of the APO link, a network management system may trigger the next APO link of this APO link to perform power regulation.

In an exemplary embodiment, before any APO link in the one or more pre-divided APO links is triggered to perform power regulation, the method may further include the following act.

The network management system may divide the one or more APO links and configures the one or more APO modules.

When dividing the one or more APO links, the network management system may determine optical add/drop stations and optical terminal stations as origin stations or termination stations of the one or more APO links, divide a working line and a protection line into two APO links when the working line and the protection line include optical amplifiers, divide the working line and the protection line into one APO link when there are only optical fibers on the working line and the protection line, and independently divide the one or more APO links for different transmission directions respectively.

In an exemplary embodiment, the operation that the APO link is triggered to perform power regulation may include the following acts.

When input power of a receiving side of the two adjacent stations in the APO link meets a first predetermined condition, output power of a sending side of the two adjacent stations may be queried. When a calculation result based on the input power and the output power meets a second predetermined condition, the APO link may be triggered to initiate a regulation command, and an attenuation amount or a gain value of optical signal power between the two adjacent stations may be regulated according to the regulation command.

In an exemplary embodiment, the first predetermined condition may be as follows: an absolute value of a difference value between the input power and a preset input power reference value exceeds a preset input power fluctuation threshold.

In an exemplary embodiment, the second predetermined condition may be as follows: both an accumulated power offset and a local power offset between the two adjacent stations exceed a preset threshold, and a number of times for which both the accumulated power offset and the local power offset between the two adjacent stations exceed the preset threshold may be larger than 2.

In the exemplary embodiment, the accumulated power offset between the two adjacent stations may be a sum of the local power offset between the two adjacent stations and an upstream accumulated power offset.

In the exemplary embodiment, the local power offset between the two adjacent stations may be obtained by subtracting a line attenuation value and a gain offset between the two adjacent stations from a gain of the power detector. The line attenuation value may be obtained by subtracting the output power from the input power; the gain offset may be a preset value.

In the exemplary embodiment, the upstream accumulated power offset may refer to an accumulated power offset between two adjacent stations prior to the two adjacent stations in the APO link to which the APO module belongs along a service direction.

In an exemplary embodiment, the operation that each APO module in one to one correspondence with every two adjacent stations in the APO link regulates the power attenuation or the gain between the two adjacent stations corresponding to the APO module may include the following acts.

After the APO link initiates a regulation command or a regulation command is received from the network management system, each APO module in one to one correspondence with every two adjacent stations may sequentially regulate an attenuation amount or a gain value of optical signal power between the two adjacent stations in the APO link. After the attenuation amount or the gain value of the optical signal power between two adjacent stations is completely regulated, if a state between the two adjacent stations is not abnormal, an attenuation amount or a gain value of optical signal power between next two adjacent stations may be regulated. When an attenuation amount or a gain value of the optical signal power between last two adjacent stations is completely regulated and a state between the last two adjacent stations is not abnormal, a regulation success event may be reported to the network management system.

In an exemplary embodiment, that the state is not abnormal may refer to that: the accumulated power offset is less than or equal to 0.5 dB.

Some exemplary embodiments of the disclosure provide a novel APO control solution in an optical fiber communication system, and realize an automatic optimization function for main optical power in the system. The network management system may implement APO power regulation in cooperation with one or more pieces of wavelength division communication system station equipment. In the solution, the network management system may be only responsible for configuration and management, and single boards in the stations may be responsible for abnormity monitoring and automatic power regulation optimization, so that a response speed of the system for a change of the main optical power and execution efficiency may be improved. The single boards may adopt regular query, and in the meantime may receive power performance and alarms reported by each node in the lines, so that timely acquisition of the current situation can be ensured, and there is no additional burden on the network management system.

After the drawings and detailed descriptions are read and understood, the other aspects may be comprehended.

DETAILED DESCRIPTION OF THE EMBODIMENTS

It is important to note that embodiments of the disclosure and characteristics in the embodiments may be freely combined without conflicts.

First Exemplary Embodiment

Figure 1:
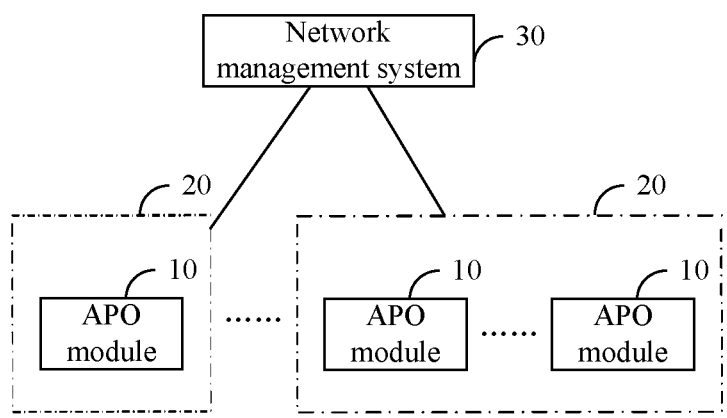
FIG. 1 is a schematic diagram of a distributed APO system according to a first exemplary embodiment.

A distributed APO system may be applied to a wavelength division communication system. As shown in FIG. 1, the distributed APO system may include one or more APO modules 10 and a network management system 30.

The one or more APO modules 10 (also called as APO groups) may belong to one or more pre-divided APO links 20. Each APO module 10 may belong to only one APO link 20 (that is, different APO links 20 may include different APO modules 10). Each APO module 10 in one APO link 20 may be in one to one correspondence with every two adjacent stations in the APO link 20.

The APO module 10 may be configured to, when the APO link 20 to which the APO module 10 belongs is triggered to perform power regulation, regulate a power attenuation or a gain between the two adjacent stations corresponding to the APO module 10 and report a regulation result.

The network management system 30 may be configured to, when learning that all of one or more APO modules 10 in an APO link 20 are successful in regulation, trigger a next APO link 20 of this APO link 20 to perform power regulation.

If there is no next APO link 20 of the APO link 20, power regulation may be completed. Every two adjacent stations in one APO link 20 may correspond to one APO module 10, and each APO module 10 may regulate power between the two adjacent stations corresponding to the APO module 10. For example, there may be totally N stations (N is an integer more than 1) in one APO link 20. Along a service direction, the first station and the second station may correspond to a first APO module 10, the second station and the third station correspond to a second APO module 10, . . . , and so on. It may be concluded that the APO link 20 may correspond to N−1 APO modules 10 in total.

In the embodiment, power regulation may be implemented by each APO module 10, so that a burden of the network management system 30 may be prevented from being increased. The one or more APO modules 10 may be arranged in, but not limited to, wavelength division communication system station equipment.

The network management system 30 may be further configured to divide the one or more APO links 20 and configure the one or more APO modules 10.

When dividing the one or more APO links 20, the network management system 30 may determine optical add/drop stations and optical terminal stations as origin stations or termination stations of the one or more APO links 20, divide a working line and a protection line into two APO links 20 when the working line and the protection line include optical amplifiers, divide the working line and the protection line into one APO link 20 when there are only optical fibers on the working line and the protection line, and independently divide the one or more APO links 20 for different transmission directions respectively.

In an exemplary embodiment, the APO module 10 may include an attenuation regulator, an APO controller and a power detector.

The attenuation regulator may be configured to regulate optical signal power between the two adjacent stations corresponding to the APO module 10 according to a set attenuation amount or gain value (which may be regulated by the APO controller).

The APO controller may be configured to, when being triggered to perform power query, query output power of a sending side of the two adjacent stations, when calculation results of input power and the output power meet a second predetermined condition, trigger a head node in the APO link 20 to which the APO module 10 belongs to initiate a regulation command, and regulate an attenuation amount or a gain value of the attenuation regulator according to the regulation command. In the exemplary embodiment, the head node may refer to an APO controller of an APO module 10 corresponding to first two adjacent stations, sequentially counted along a service direction, in an APO link 20.

The power detector may be configured to, when the input power of a receiving side of the two adjacent stations meets a first predetermined condition, trigger the APO controller to perform power query.

In the exemplary embodiment, the sending side of the two adjacent stations may refer to a sender of the first station, counted along a service direction, in the two adjacent stations. The receiving side of the two adjacent stations may refer to a receiver of the latter station, counted along a service direction, in the two adjacent stations.

In an exemplary embodiment, the network management system 30 may be further configured to transmit configuration information of the one or more APO links 20 and the one or more APO modules 10. The configuration information of the one or more APO links 20 and the one or more APO modules 10 may include address information of head, end and intermediate nodes in each APO link 20, upstream/downstream relationships among various APO modules 10 in each APO link 20, and a location of a board where each component in each APO module 10 is located. In the exemplary embodiment, the end node may refer to an APO controller of an APO module 10 corresponding to last two adjacent stations, sequentially counted along a service direction, in one APO link 20. The intermediate node may refer to an APO controller of an APO module 10 except the head and end nodes.

The network management system 30 may trigger an APO link 20 to perform power regulation in a following manner.

The network management system 30 may send a regulation command to the head node of the APO link 20.

In an exemplary embodiment, information interaction may be performed, through optical monitoring channels in wavelength division equipment, between APO controllers of different APO modules 10 and between an APO controller and the attenuation regulator and power detector in the APO module 10 where the APO controller is located.

In an exemplary embodiment, the first predetermined condition may be that: an absolute value of a difference value between the input power and a preset input power reference value exceeds a preset input power fluctuation threshold.

In an exemplary embodiment, the second predetermined condition may be that: both an accumulated power offset and a local power offset between the two adjacent stations exceed a preset threshold, and a number of times for which both the accumulated power offset and the local power offset between the two adjacent stations exceed the preset threshold is larger than 2.

In the exemplary embodiment, the accumulated power offset between the two adjacent stations may be a sum of the local power offset between the two adjacent stations and an upstream accumulated power offset.

In the exemplary embodiment, the local power offset between the two adjacent stations may be obtained by subtracting a line attenuation value and a gain offset between the two adjacent stations from a gain of the power detector. The line attenuation value may be obtained by subtracting the output power from the input power. The gain offset may be a preset value.

In the exemplary embodiment, the upstream accumulated power offset may refer to an accumulated power offset between two adjacent stations prior to the two adjacent stations in the APO link 20 to which the APO module 10 belongs along a service direction.

In an exemplary embodiment, the APO controller may be configured to regulate the attenuation amount or the gain value of the attenuation regulator according to the regulation command in a following manner.

When the APO controller is the head node, after the regulation command is initiated or the regulation command is received from the network management system 30, the attenuation amount or the gain value of the attenuation regulator of the corresponding APO module 10 may be regulated. After the attenuation regulator completes executing the regulation command (that is, the attenuation regulator regulates the optical signal power between the two adjacent stations corresponding to the APO module 10 according to the set attenuation amount or gain value), if a state of the head node is not abnormal, a next node may be determined as a current node, and a regulation command may be transmitted to the current node. After a regulation success message is received, if it is the end node returning the regulation success message, a regulation success event may be reported to the network management system 30. If it is not the end node returning the regulation success message, a next node of the current node in the corresponding APO link 20 may be determined as the current node, and a regulation command may be transmitted to the current node.

When the APO controller is not the head node, the attenuation amount or the gain value of the attenuation regulator of the corresponding APO module 10 may be regulated after the regulation command is received. And after the attenuation regulator completes executing the regulation command, if the state of the node is not abnormal, a regulation success message may be returned to the head node.

When learning that all of one or more APO modules 10 in one APO link 20 are successful in regulation, the network management system 30 may trigger a next APO link 20 of this APO link 20 to perform power regulation in a following manner.

After receiving the regulation success event reported by the head node in one APO link 20, the network management system 30 may learn about that all of one or more APO modules 10 in one APO link 20 are successful in regulation (that is, power regulation of the APO link 20 is completed), and may send a regulation command to the head node of a next APO link 20 of the APO link 20 along a service direction. If the APO link 20 is the last APO link, power regulation may be completed.

In an exemplary embodiment, that the state is not abnormal may refer to that: the accumulated power offset is less than or equal to 0.5 dB.

In an exemplary embodiment, the APO controller may be an SNP board; a power reference point may be an OBA board; the attenuation regulator may be an ATT single board or an OPA single board; and the power detector may be an OPA single board.

Division of the one or more APO links 20 and the one or more APO modules 10 will be introduced below in detail.

Figure 2:
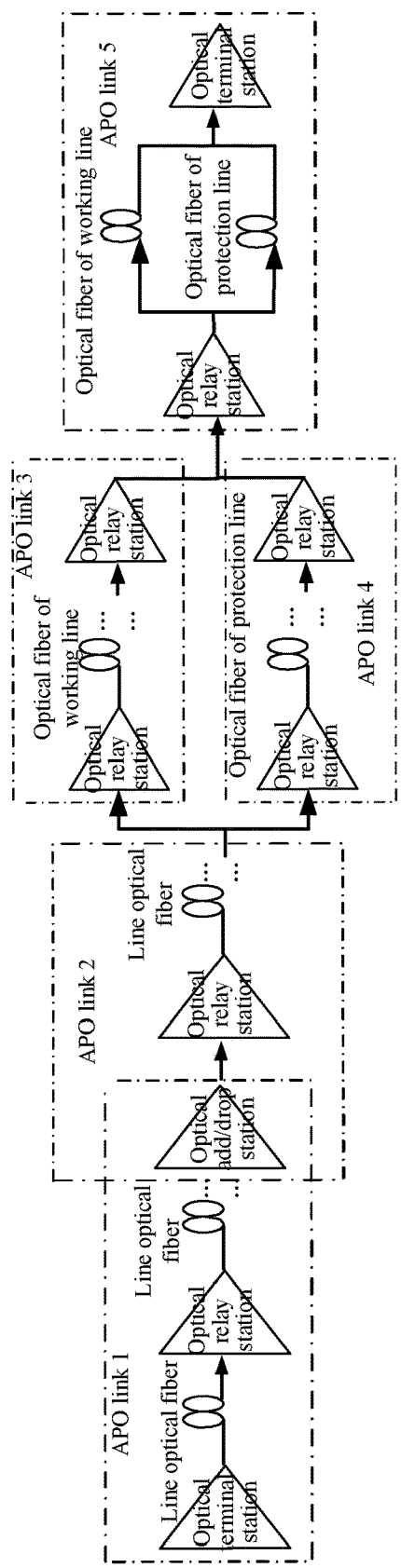
FIG. 2 is a schematic diagram of dividing APO links in a wavelength division communication system according to a first exemplary embodiment.

A structure of a wavelength division communication system is shown in FIG. 2. There may be stations with different functions in the system, and the whole network may form a net structure. For conveniently adopting a unified power optimization policy, the stations in the network may be suggested to be divided into different groups for management. In the disclosure, each group may be called as one APO link (for example, APO links 1~5 in FIG. 2), and each APO link may be formed by multiple pieces of point-to-point linearly connected equipment (i.e. the stations). By such division, transmitted signal power between upstream and downstream stations in each APO link may form a fixed relationship with line loss between the stations. The following division principles may be adopted.

(1) Optical add/drop stations and optical terminal stations should be origin stations or termination stations of the one or more APO links. For example, in FIG. 2, an origin station of an APO link 1 is an optical terminal station, and a termination station is an optical add/drop station, which also serves as an origin station of an APO link 2.

(2) Under the condition that a working line and a protection line include optical amplifiers, the working line and the protection line are suggested to be divided into two APO links, for example, an APO link 3 and APO link 4 in FIG. 2.

(3) Under the condition that there are only optical fibers in the working and protection lines, only one APO link may be configured for management, for example, an APO link 5 in FIG. 2.

(4) FIG. 2 shows only one service transmission direction of a bidirectional transmission system, and for an oppositely transmitted service, new APO links may be configured according to the above principles. That is, one or more APO links may be independently divided for different transmission directions respectively.

The principles may be applied to double-fiber bidirectional and single-fiber bidirectional systems.

For conveniently establishing an upstream and downstream management relationship for each piece of wavelength division equipment, within one APO link, a power detection point between two adjacent stations and an adjustable regulator and/or an optical amplifier with an adjustable gain may be configured into an APO module. An APO module may include an APO controller, an attenuation regulator and a power detector. These components may be located on a single board of any station in the two adjacent stations. Different components may be located in the same station of the two adjacent stations, and may also be located in different stations of the two adjacent stations.

Figure 3:
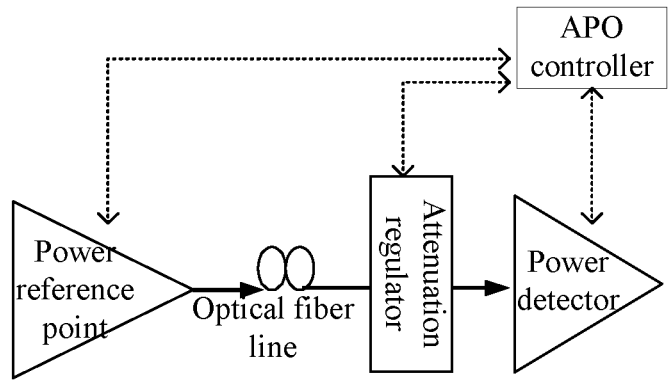
FIG. 3 is a schematic diagram of an APO module according to a first exemplary embodiment.

The components (which may also be called as elements) in an APO module, as shown in FIG. 3, are defined as follows.

The APO controller is a manager in the APO module. The APO controller may be configured to be responsible for controlling communication between single boards of the corresponding APO module, controlling a regulation flow of the APO link to which the APO module belongs, querying output power of a power reference point, calculating a local power error and an accumulated power error, reporting an abnormity to a network management system when both of the local power error and the accumulated power error exceed a threshold and the condition of exceeding the threshold appears more than twice. The APO controller may also be configured to be responsible for reporting an alarm to the network management system and a head node, initiating or receiving a regulation command and querying or setting an attenuation amount of the attenuation regulator. A corresponding entity may be a master control board of station equipment, and may also be any function board of the above processing capabilities. Information interaction may be implemented, through optical monitoring channels in wavelength division equipment, between APO controllers of different APO modules and between an APO controller and the other components in the corresponding APO module. In the exemplary embodiment, the power reference point may refer to a board where an output power detection point of a sending side (for example, a sender of the optical add/drop station in the APO link 2 in FIG. 2) of the two adjacent stations is located. The power reference point may be an output port of an erbium-doped fiber or Raman principle-based optical amplification single board, and may receive a query operation of the APO controller.

The power detector may be a board where an input power detection point of a receiving side (for example, a receiver of an optical relay station in the APO link 2 in FIG. 2) of the two adjacent stations is located. The power detector may be configured to calculate fluctuation of current input power according to a preset input power reference value and the current input power, and if a preset input power fluctuation threshold is exceeded, report a "power error threshold excess" alarm to the APO controller and trigger a power query flow of the APO controller. The input power reference value may be updated by the power detector triggered by the APO controller, and input power at an updating moment may be determined as an updated input power reference value.

The attenuation regulator may be an adjustable attenuator or optical amplifier with an adjustable gain between the power reference point and the power detector. The attenuation regulator may be configured to receive and process a regulation command and query command sent by the APO controller.

In addition, a head node, an intermediate node and an end node in the application are defined as follows.

The head node may be an APO controller of a first APO module, counted along a service direction, in each APO link.

The end node may be an APO controller of a last APO module, counted along a service direction, in each APO link.

The intermediate node may be an intermediate APO controller except the head node and end node in one APO link.

A working flow of a distributed APO system will be introduced below in detail.

The working flow may be divided into three parts: a configuration flow, an abnormity monitoring flow and a regulation flow.

1: The Configuration Flow

An operator may manually create one or more APO links and one or more APO modules in each APO link; or a network management system may automatically generate one or more APO links and one or more APO modules according to a management object division principle after a service connecting relationship of the system has been configured. After creation or generation, configuration information of the one or more APO links and the one or more APO modules may be transmitted to each APO controller.

The configuration information of the one or more APO links and the one or more APO modules may include address information of head, end and intermediate nodes in each APO link, upstream/downstream relationships among various APO modules in each APO link, a location of a board where each component in each APO module is located, and the like.

A transmission manner may be that the network management system transmits the configuration information of the one or more APO links and the one or more APO modules to the head nodes for the head nodes to forward the configuration information to the other nodes (the end nodes and the intermediate nodes). Another transmission manner may be that the network management system transmits the configuration information of the one or more APO links and the one or more APO modules to one or more nodes respectively (including the head nodes, the end nodes and the intermediate nodes).

2: The Abnormity Monitoring Flow, this Flow being Independently Executed by Each APO Link Each node (including the head node, the end node and the intermediate node) may receive an APO link enabling command of the head node of the APO link with the corresponding APO module, and enter the abnormity monitoring flow. The head node may transmit the APO link enabling command according to an instruction of the network management system, and may alternatively transmit the APO link enabling command when a preset transmission condition is met.

Figure 4:
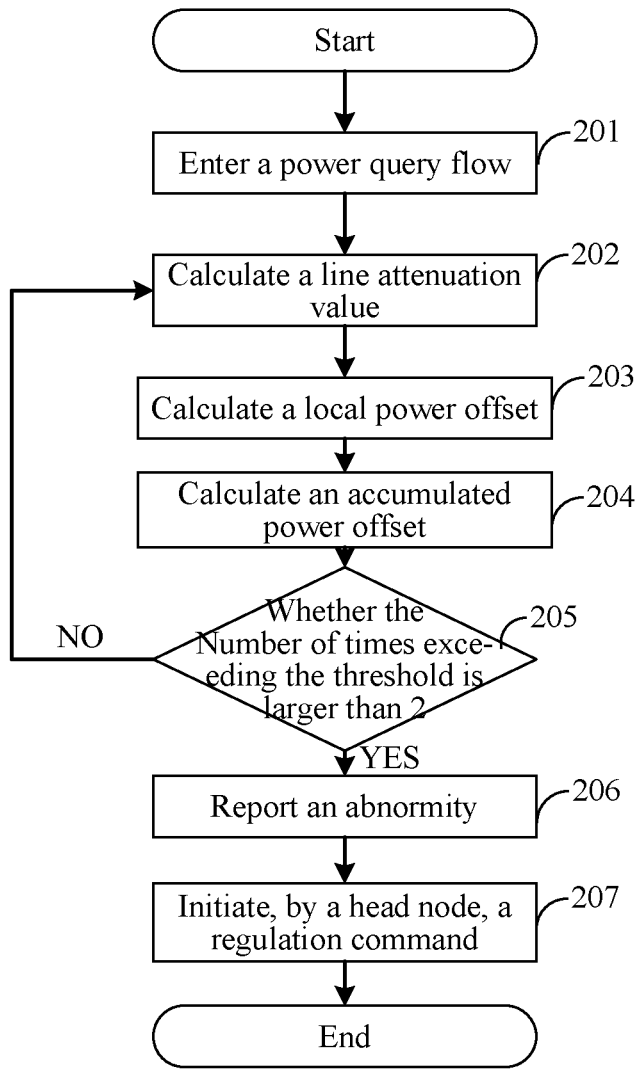
FIG. 4 is a schematic diagram of link loss.

An execution process of the abnormity monitoring flow in an APO link, as shown in FIG. 4, may include the following acts.

At act 201, after enabling of the APO link is completed or power regulation of the APO link is ended, an APO controller in each APO module may transmit a power reference value updating command to a power detector of the APO module. The power detector may detect a difference value between input power and an input power reference value in real time (an absolute value of the difference value may be the abovementioned input power fluctuation). When a preset input power fluctuation threshold is exceeded, the power detector may report a "power fluctuation threshold excess" alarm to the APO controller. The APO controller may directly enter a power query flow after receiving the alarm.

Figure 5:
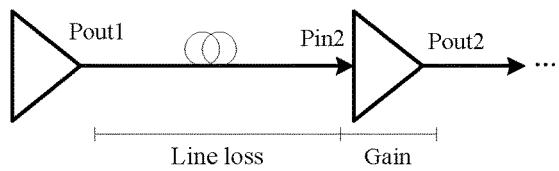
FIG. 5 is a schematic diagram of an abnormity monitoring flow.

At act 202, a line attenuation $A_n$ between corresponding two adjacent stations may be calculated. As shown in FIG. 5, for the two adjacent stations, output power of a sender of the first station counted along a service direction is Pout1 (i.e. output power detected on a power reference point), input power of a receiver of the latter station is Pin2 (i.e. input power detected by the power detector), and a line attenuation value $A_n$ is Pin2−Pout1.

At act 203, a local power offset ($P_{offset(n)}$) between the two adjacent stations may be calculated as follows: a gain $G_n$ of the power detector-(the line attenuation value $A_n$+a gain offset $G_{offset}$)=the local power offset ($P_{offset(n)}$). The gain $G_n$, as shown in FIG. 5, may be obtained by output power Pout2 of the power detector−Pin2. The gain offset may be a preset value. During system design, for a power budget requirement, a gain of an amplifier of a certain stage may be regulated to a certain value, resulting in that the gain of the amplifier may be inconsistent with an attenuation of a transmission optical fiber of a previous stage of the amplifier, and thus an "offset" is formed.

At act 204, an accumulated power offset ($P_{accumulate\ offset(n)}$) between the two adjacent stations may be calculated as follows:

the local power offset($P_{offset(n)}$)+an upstream accumulated power offset($P_{accumulate\ offset(n-1)}$)=the accumulated power offset($P_{accumulate\ offset(n)}$).

The upstream accumulated power offset may refer to an accumulated power offset between two adjacent stations prior to the two adjacent stations in the APO link along a service direction. Herein, n is a sequence number of an APO module in the APO link. For example, along a service direction, an APO controller of a first APO module (corresponding to first and second stations of the APO link) may calculate that an accumulated power offset ($P_{accumulate\ offset(1)}$)=a local power offset ($P_{offset(1)}$). Since two adjacent nodes prior to the two adjacent nodes corresponding to the first APO module do not exist, an upstream accumulated power offset is 0. An APO controller of a second APO module (corresponding to second and third stations of the APO link) may calculate that an accumulated power offset ($P_{accumulate\ offset(2)}$)=a local power offset ($P_{offset(2)}$)+the upstream accumulated power offset ($P_{accumulate\ offset(1)}$).

At act 205, whether the accumulated power offset and local power offset between the two adjacent stations are both within a preset threshold range or not may be judged. If both of the accumulated power offset and local power offset exceed a threshold and a number of times for which the threshold is exceeded is less than or equal to 2, the locally stored upstream accumulated power offset and the output power may be cleared, and the upstream accumulated power offset may be re-queried for recalculation and comparison. If both of the accumulated power offset and local power offset exceed the threshold and the number of times for which the threshold is exceeded is more than 2, act 206 may be executed.

At act 206, an abnormity may be reported to the network management system.

At act 207, a head node of the APO link to which the APO module belongs may be triggered to initiate a regulation command.

3: The Regulation Flow, this Flow being Independently Executed by Each APO Link

Figure 6:
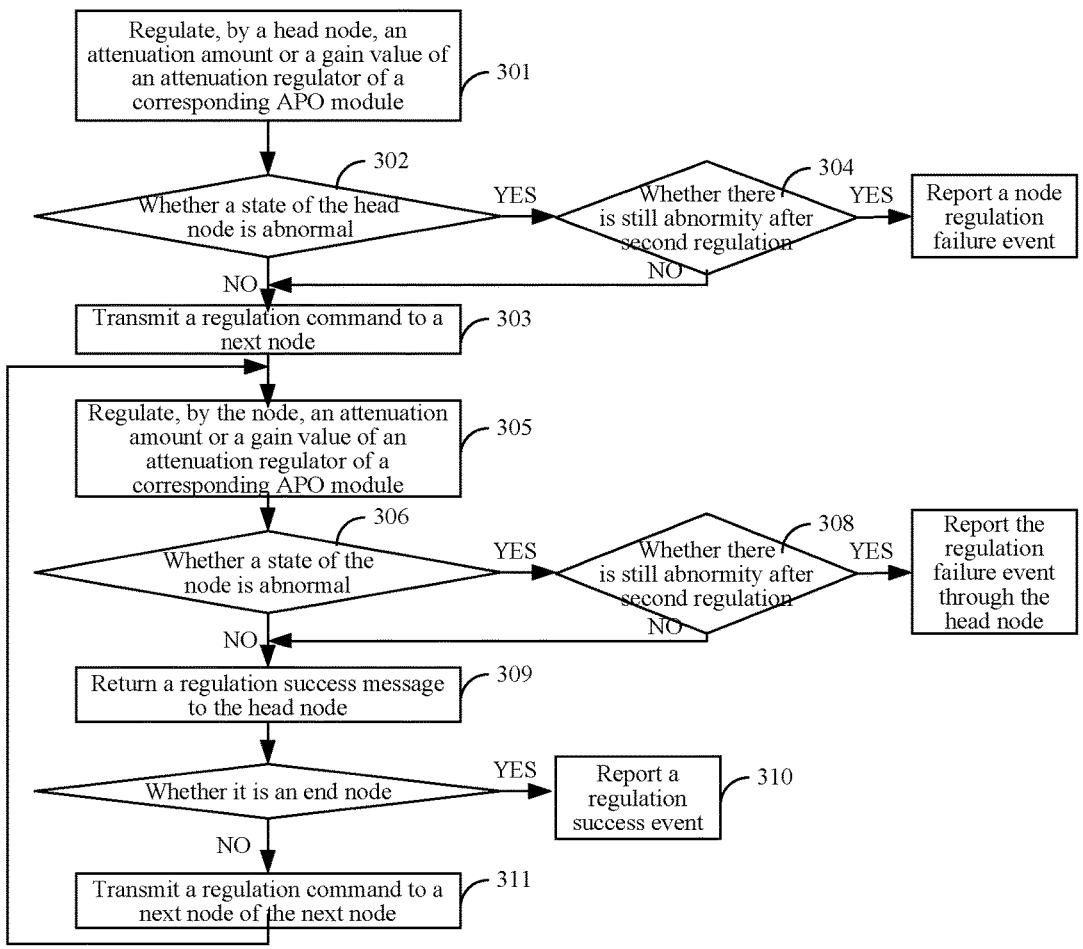
FIG. 6 is a schematic diagram of a regulation flow.

An execution process of the regulation flow in an APO link, as shown in FIG. 6, may include the following acts.

At act 301, after the head node initiates a regulation command or a regulation command is received from the network management system, an attenuation amount or a gain value of the attenuation regulator of the corresponding APO module may be regulated.

At act 302, after the attenuation regulator completes executing an attenuation regulation command, the head node may judge whether a state of the head node is abnormal or not (for example, $P_{accumulate\ offset(n)} \leq 0.5$ dB is not abnormal, and a numerical value may be autonomously set), act 303 may be executed if there is no abnormity, and act 304 is executed if there is an abnormity.

At act 303, a regulation command may be transmitted to a next node of the APO link to which the APO module belongs, and act 305 may be executed.

At act 304, second regulation may be performed. After second regulation, whether the state of the head node is abnormal or not may be judged, act 303 may be executed if there is no abnormity, and a node regulation failure event may be reported to the network management system if there is still an abnormity.

At act 305, the node receiving the regulation command may regulate an attenuation coefficient or gain value of the attenuation regulator of the corresponding APO module.

At act 306, after the attenuation regulator completes executing the regulation command, whether a state of the local node is abnormal or not may be judged, act 307 may be executed if there is no abnormity, and act 308 may be executed if there is an abnormity.

At act 307, a regulation success message may be returned to the head node, and act 309 may be executed.

At act 308, second regulation may be performed. After second regulation, whether the state of the local node is abnormal or not may be judged, act 307 may be executed if there is no abnormity, and the node regulation failure event may be reported to the network management system through the head node if there is still an abnormity.

At act 309, after the head node receives the regulation success message, whether the node returning the regulation success message is an end node or not may be judged, act 310 may be executed if it is the end node, and act 311 may be executed if it is not the end node returning the regulation success message.

At act 310, the head node may report a regulation success event to the network management system, and the power regulation flow of the APO link where the head node is located ends.

At act 311, the head node may transmit a regulation command to a next node of the next node (i.e. the next node of the node reporting the regulation success message), and act 305 may be re-executed.

A regulation principle is described as follows.

Along a service direction, regulation may be performed one by one from front to back. After regulation of earlier APO links is successful, regulation of subsequent APO links may be performed. If the regulation fails, the node regulation failure event may be reported, and regulation may be terminated.

A principle that the APO link is successful in regulation (i.e. a condition that the state of the node is not abnormal) may be, but not limited to: $P_{accumulate\ offset(n)} \leq 0.5$ dB, and the numerical value may be autonomously set.

First Implementation Example

Figure 7:
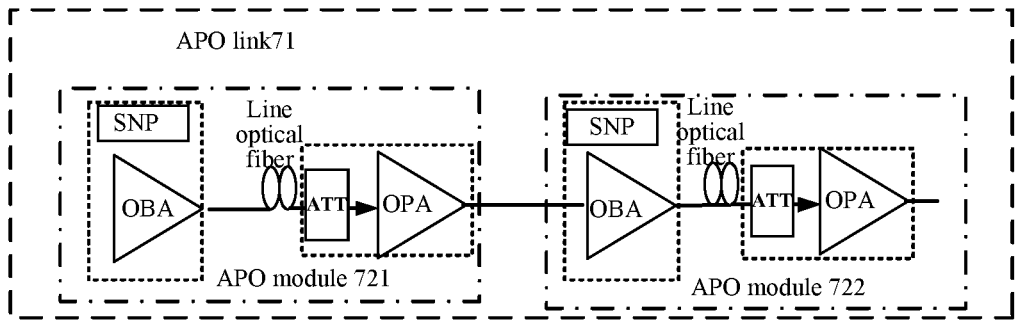
FIG. 7 is a schematic diagram of a first implementation example.

A bidirectional Office Automation (OA) system, as shown in FIG. 7, may include an APO link 71. The APO link 71 may include an APO module 721 and an APO module 722. An APO configuration condition may be as follows.

In the two APO modules, APO controllers may be SNP boards in the APO link 71. Power reference points may be OBA boards in FIG. 7. Attenuation regulators may be ATT single boards in FIG. 7, and single boards OPA of power detectors in the APO link may alternatively be set to be the attenuation regulators. Power detectors may be the OPA single boards in FIG. 7.

Second Implementation Example

Figure 8:
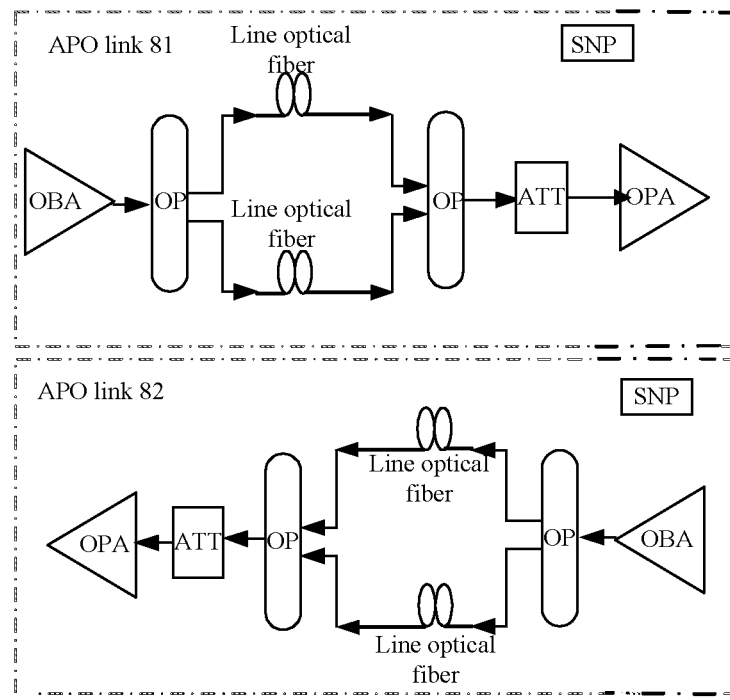
FIG. 8 is a schematic diagram of a second implementation example.

A bidirectional optical fiber protection system, as shown in FIG. 8, may include an APO link 81 and an APO link 82. An APO configuration condition is described as follows.

In the APO link 81 and the APO link 82, APO controllers may be, as shown in FIG. 8, SNP single boards in the APO link 81 and the APO link 82. Power reference points may be OBA boards in FIG. 8. Attenuation regulators may be ATT single boards in FIG. 8, and single boards OPA of power detectors in the links may alternatively be set to be the attenuation regulators. Power detectors may be the OPA single boards in FIG. 8.

Second Exemplary Embodiment

Figure 9:
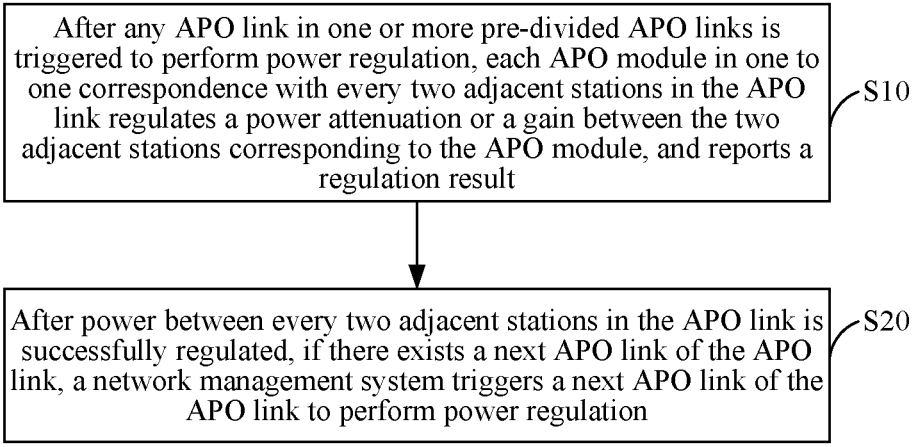
FIG. 9 is a flowchart of a distributed APO method according to a second exemplary embodiment.

A distributed APO method may be applied to a wavelength division communication system. As shown in FIG. 9, the distributed APO method may include acts S10~S20.

At act S10, after any APO link in one or more pre-divided APO links is triggered to perform power regulation, each APO module in one to one correspondence with every two adjacent stations in the APO link may regulate a power attenuation or a gain between the two adjacent stations corresponding to the APO module, and may report a regulation result. The APO module may be arranged on any station in the two adjacent stations, and the stations may be wavelength division communication system station equipment.

At act S20, after power between every two adjacent stations in the APO link is successfully regulated, if there is a next APO link of the APO link, a network management system may trigger a next APO link of this APO link to perform power regulation.

In an exemplary embodiment, before any APO link in the one or more pre-divided APO links is triggered to perform power regulation, the method may further include the following act.

The network management system may divide the one or more APO links and configures the one or more APO modules.

When dividing the one or more APO links, the network management system may determine optical add/drop stations and optical terminal stations as origin stations or termination stations of the one or more APO links, divide a working line and a protection line into two APO links when the working line and the protection line include optical amplifiers, divide the working line and the protection line into one APO link when there are only optical fibers on the working line and the protection line, and independently divide the one or more APO links for different transmission directions respectively.

In an exemplary embodiment, the operation that the APO link is triggered to perform power regulation may include the following acts.

When input power of a receiving side of the two adjacent stations in the APO link meets a first predetermined condition, output power of a sending side of the two adjacent stations may be queried. When a calculation result based on the input power and the output power meets a second predetermined condition, the APO link may be triggered to initiate a regulation command, and an attenuation amount or a gain value of optical signal power between the two adjacent stations may be regulated according to the regulation command.

In an exemplary embodiment, the first predetermined condition may be that: an absolute value of a difference value between the input power and a preset input power reference value exceeds a preset input power fluctuation threshold.

In an exemplary embodiment, the second predetermined condition may be that: both an accumulated power offset and a local power offset between the two adjacent stations exceed a preset threshold, and a number of times for which both the accumulated power offset and the local power offset between the two adjacent stations exceed the preset threshold may be larger than 2.

In the exemplary embodiment, the accumulated power offset between the two adjacent stations may be a sum of the local power offset between the two adjacent stations and an upstream accumulated power offset.

In the exemplary embodiment, the local power offset between the two adjacent stations may be obtained by subtracting a line attenuation value and a gain offset between the two adjacent stations from a gain of the power detector. The line attenuation value may be obtained by subtracting the output power from the input power. The gain offset may be a preset value.

The upstream accumulated power offset may refer to an accumulated power offset between two adjacent stations prior to the two adjacent stations in the APO link to which the APO module belongs along a service direction.

In an exemplary embodiment, the operation that each APO module in one to one correspondence with every two adjacent stations in the APO link regulates the power attenuation or the gain between the two adjacent stations corresponding to the APO module may include the following acts.

After the APO link initiates a regulation command or a regulation command is received from the network management system, each APO module in one to one correspondence with every two adjacent stations may sequentially regulate an attenuation amount or a gain value of optical signal power between the two adjacent stations in the APO link. After the attenuation amount or the gain value of the optical signal power between two adjacent stations is completely regulated, if a state between the two adjacent stations is not abnormal, an attenuation amount or a gain value of optical signal power between next two adjacent stations may be regulated. When an attenuation amount or a gain value of the optical signal power between last two adjacent stations is completely regulated and a state between the last two adjacent stations is not abnormal, a regulation success event may be reported to the network management system.

For example, there may be sequentially four stations D1, D2, D3 and D4 along a service direction, an attenuation amount or a gain value of optical signal power between D1 and D2 may be regulated at first. If a state between D1 and D2 is not abnormal after regulation, an attenuation amount or a gain value of optical signal power between D2 and D3 may be regulated. If a state between D2 and D3 is not abnormal after regulation, an attenuation amount or a gain value of optical signal power between D3 and D4 may be regulated. If a state between D3 and D4 is not abnormal after regulation, a regulation success event may be reported to the network management system.

After receiving the regulation success event, the network management system may learn about that power between every two adjacent stations in the APO link is successfully regulated.

In an exemplary embodiment, that the state is not abnormal may refer to that: the accumulated power offset is less than or equal to 0.5 dB.

INDUSTRIAL APPLICABILITY

Some embodiments of the disclosure provide a novel APO control solution in an optical fiber communication system, and realize an automatic optimization function for main optical power in the system. The network management system may implement APO power regulation in cooperation with one or more pieces of wavelength division communication system station equipment. In the solution, the network management system may be only responsible for configuration and management, and single boards in the stations may be responsible for abnormity monitoring and automatic power regulation optimization, so that a response speed of the system for a change of the main optical power and execution efficiency may be improved. The single boards may adopt regular query, and in the meantime may receive power performance and alarms reported by each node in the lines, so that timely acquisition of the current situation can be ensured, and there is no additional burden on the network management system.

What is claimed is:

1. A distributed Automatic Power Optimization (APO) system, applied to a wavelength division communication system, the distributed APO system comprising:
one or more APO modules, wherein the one or more APO modules belong to one or more pre-divided APO links, each APO module in the one or more APO modules belongs to only one APO link, each APO module in one APO link is in one to one correspondence with every two adjacent stations in the APO link, and
the APO module is configured to, when the APO link to which the APO module belongs is triggered to perform power regulation, regulate a power attenuation or a gain between the two adjacent stations corresponding to the APO module and report a regulation result; and
a network management system, configured to, when learning that all of the one or more APO modules in one APO link are successful in regulation, if there is a next APO link of the APO link, trigger the next APO link of the APO link to perform power regulation;
wherein the APO module comprises: an attenuation regulator, an APO controller and a power detector, wherein the attenuation regulator is configured to regulate optical signal power between the two adjacent stations corresponding to the APO module according to a set attenuation amount or gain value; the power detector is configured to, when input power of a receiving side of the two adjacent stations meets a first predetermined condition, trigger the APO controller to perform power query; and the APO controller is configured to, when being triggered to perform power query, query output power of a sending side of the two adjacent stations, and when a calculation result based on the input power and the output power meets a second predetermined condition, trigger a head node in the APO link to which the APO module belongs to initiate a regulation command, and regulate an attenuation amount or a gain value of the attenuation regulator according to the regulation command, wherein the head node refers to an APO controller of an APO module corresponding to first two adjacent stations, sequentially counted along a service direction, in one APO link.

2. The distributed APO system as claimed in claim 1, wherein
the network management system is further configured to divide the one or more APO links and configure the one or more APO modules; and
when dividing the one or more APO links, the network management system determines optical add/drop stations and optical terminal stations as origin stations or termination stations of the one or more APO links, divide a working line and a protection line into two APO links when the working line and the protection line comprise optical amplifiers, divide the working line and the protection line into one APO link when there are only optical fibers on the working line and the protection line, and independently divide the one or more APO links for different transmission directions respectively.

3. The distributed APO system as claimed in claim 2, wherein
the network management system is further configured to transmit configuration information of the one or more APO links and the one or more APO modules; the configuration information of the one or more APO links and the one or more APO modules comprises address information of head, end and intermediate nodes in each APO link, upstream/downstream relationships among various APO modules in each APO link, and a location of a board where each component in each APO module is located; an end node refers to an APO controller of an APO module corresponding to last two adjacent stations, sequentially counted along the service direction, in one APO link; and an intermediate node refers to an APO controller of an APO module except the head and end nodes.

4. The distributed APO system as claimed in claim 3, wherein the APO controller is configured to regulate the attenuation amount or the gain value of the attenuation regulator according to the regulation command in a following manner:
when the APO controller is the head node, after the regulation command is initiated or the regulation command is received from the network management system, the attenuation amount or the gain value of the attenuation regulator of the corresponding APO module is regulated; after the attenuation regulator completes executing the regulation command, if a state of the head node is not abnormal, a next node is determined as a current node, and a regulation command is transmitted to the current node; after a regulation success message is received, if it is the end node returning the regulation success message, a regulation success event is reported to the network management system; if it is not the end node returning the regulation success message, a next node of the current node in the corresponding APO link is determined as the current node, and a regulation command is transmitted to the current node;
when the APO controller is not the head node, the attenuation amount or the gain value of the attenuation regulator of the corresponding APO module is regulated after the regulation command is received; and after the attenuation regulator completes executing the regulation command, if the state of the node is not abnormal, a regulation success message is returned to the head node.

5. The distributed APO system as claimed in claim 4, wherein the network management system, when learning that all of one or more APO modules in one APO link are successful in regulation, triggering the next APO link of the APO link to perform power regulation comprises that:
when receiving the regulation success event reported by the head node in one APO link, the network management system sends a regulation command to the head node of a next APO link of the APO link along a service direction.

6. The distributed APO system as claimed in claim 4, wherein that the state is not abnormal refers to that: the accumulated power offset is less than or equal to 0.5 dB.

7. The distributed APO system as claimed in claim 4, wherein
the APO controller is a Smart Node Protection (SNP) board; a power reference point is an Optical Booster Amplifier (OBA) board; the attenuation regulator is an Attenuator (ATT) single board or an Optical Pre-Amplifier (OPA) single board; and the power detector is an OPA single board.

8. The distributed APO system as claimed in claim 1, wherein
information interaction is performed, through optical monitoring channels in wavelength division equipment, between APO controllers of different APO modules and between an APO controller and the attenuation regulator and power detector in the APO module where the APO controller is located.

9. The distributed APO system as claimed in claim 1, wherein
the first predetermined condition is that: an absolute value of a difference value between the input power and a preset input power reference value exceeds a preset input power fluctuation threshold.

10. The distributed APO system as claimed in claim 1, wherein
the second predetermined condition is that: both an accumulated power offset and a local power offset between the two adjacent stations exceed a preset threshold, and a number of times for which both the accumulated power offset and the local power offset between the two adjacent stations exceed the preset threshold is larger than 2;
the accumulated power offset between the two adjacent stations is a sum of the local power offset between the two adjacent stations and an upstream accumulated power offset;
the local power offset between the two adjacent stations is obtained by subtracting a line attenuation value and a gain offset between the two adjacent stations from a gain of the power detector; the line attenuation value is obtained by subtracting the output power from the input power; the gain offset is a preset value; and
the upstream accumulated power offset refers to an accumulated power offset between two adjacent stations prior to the two adjacent stations in the APO link to which the APO module belongs along a service direction.

11. A distributed Automatic Power Optimization (APO) method, applied to a wavelength division communication system, the method comprising:
after any APO link in one or more pre-divided APO links is triggered to perform power regulation, regulating, by each APO module in one to one correspondence with every two adjacent stations in the APO link, a power attenuation or a gain between the two adjacent stations corresponding to the APO module, and reporting, by the APO module, a regulation result; and
after power between every two adjacent stations in the APO link is successfully regulated, if there is a next APO link of the APO link, triggering, by a network management system, the next APO link of the APO link to perform power regulation;
wherein triggering the APO link to perform power regulation comprises: when input power of a receiving side of the two adjacent stations in the APO link meets a first predetermined condition, querying output power of a sending side of the two adjacent stations; and when a calculation result based on the input power and the output power meets a second predetermined condition, triggering the APO link to initiate a regulation command, and regulating an attenuation amount or a gain value of optical signal power between the two adjacent stations according to the regulation command.

12. The method as claimed in claim 11, before triggering any APO link in the one or more pre-divided APO links to perform power regulation, further comprising:
dividing, by the network management system, the one or more APO links and configures the APO modules, wherein
when dividing the one or more APO links, the network management system determines optical add/drop stations and optical terminal stations as origin stations or termination stations of the one or more APO links, divides a working line and a protection line into two APO links when the working line and the protection line comprise optical amplifiers, divides the working line and the protection line into one APO link when there are only optical fibers on the working line and the protection line, and independently divides the one or more APO links for different transmission directions respectively.

13. The method as claimed in claim 11, wherein
the first predetermined condition is that: an absolute value of a difference value between the input power and a preset input power reference value exceeds a preset input power fluctuation threshold.

14. The method as claimed in claim 11, wherein
the second predetermined condition is that: both an accumulated power offset and a local power offset between the two adjacent stations exceed a preset threshold, and a number of times for which both the accumulated power offset and the local power offset between the two adjacent stations exceed the preset threshold is larger than 2;
the accumulated power offset between the two adjacent stations is a sum of the local power offset between the two adjacent stations and an upstream accumulated power offset;
the local power offset between the two adjacent stations is obtained by subtracting a line attenuation value and a gain offset between the two adjacent stations from a gain of the power detector; the line attenuation value is obtained by subtracting the output power from the input power; the gain offset is a preset value; and
the upstream accumulated power offset refers to an accumulated power offset between two adjacent stations prior to the two adjacent stations in the APO link to which the APO module belongs along a service direction.

15. The method as claimed in claim 11, wherein regulating, by each APO module in one to one correspondence with every two adjacent stations in the APO link, the power attenuation or the gain between the two adjacent stations corresponding to the APO module comprises:
after the APO link initiates a regulation command or a regulation command is received from the network management system, sequentially regulating, by each APO module in one to one correspondence with every two adjacent stations, an attenuation amount or a gain value of optical signal power between the two adjacent stations in the APO link, wherein, after the attenuation amount or the gain value of the optical signal power between two adjacent stations is completely regulated, if a state between the two adjacent stations is not abnormal, an attenuation amount or a gain value of optical signal power between next two adjacent stations is regulated; and when an attenuation amount or a gain value of the optical signal power between last two adjacent stations is completely regulated and a state between the last two adjacent stations is not abnormal, reporting a regulation success event to the network management system.

16. The method as claimed in claim 15, wherein
that the state is not abnormal refers to that: the accumulated power offset is less than or equal to 0.5 dB.

17. The method as claimed in claim 11, further comprising:
transmitting configuration information of the one or more APO links and the one or more APO modules; the configuration information of the one or more APO links and the one or more APO modules comprises address information of head, end and intermediate nodes in each APO link, upstream/downstream relationships among various APO modules in each APO link, and a location of a board where each component in each APO module is located; an end node refers to an APO controller of an APO module corresponding to last two adjacent stations, sequentially counted along the service direction, in one APO link; and an intermediate node refers to an APO controller of an APO module except the head and end nodes.

18. The method as claimed in claim 11, wherein information interaction is performed, through optical monitoring channels in wavelength division equipment, between APO controllers of different APO modules and between an APO controller and the attenuation regulator and power detector in the APO module where the APO controller is located.

* * * * *